UNITED STATES PATENT OFFICE.

WM. P. ALLEN, OF DUBUQUE, IOWA.

IMPROVEMENT IN COMPOSITION FOR FRICTION-MATCHES.

Specification forming part of Letters Patent No. 22,538, dated January 11, 1859.

*To all whom it may concern:*

Be it known that I, WILLIAM PAGGETT ALLEN, of the city of Dubuque, Dubuque county, State of Iowa, have discovered a new and useful Water-Proof Compound for Making Friction-Matches; and I do hereby declare that the following is a full and exact statement and description of the articles I use, of the methods I pursue in mixing them, and of the result I obtain.

First. The articles I use are commonly called "phosphorus," "sandarac," and "shellac." I herewith send specimens of each. No. 1 of the accompanying bottles contains phosphorus. No. 2 contains sandarac. No. 3 contains shellac.

Second. The method I pursue in mixing them is as follows: I take one part of sandarac and two parts of shellac by weight, and dissolve them in alcohol with or without heat, using such a quantity of alcohol as will produce a paste of about the consistency of honey. Bottle numbered four contains a specimen of it. To this paste I add phosphorus in about the proportion of one part of phosphorus to two parts of the paste by weight. I then raise the temperature of the whole sufficiently to melt or dissolve the phosphorus, after which I stir the whole until it is cooled.

Third. The result which I obtain by mixing said articles in the manner substantially as described is a compound for making friction-matches which will not be affected by moisture, and which therefore is valuable to miners, seamen, and to all other persons who wish to keep or use friction-matches in damp situations. The bottle numbered five contains a specimen of the compound. I also transmit matches which have been constructed with it.

From the foregoing statement it will be seen that I produce the said compound by mixing phosphorus with resins. Resin is insoluble in water, and upon that fact depends the insolubility of the compound. My discovery, then, is that resins in general, and those mentioned in particular, may be combined with phosphorus in making friction-match paste, and that such paste will not be affected by water. Sandarac is highly inflammable. Shellac is but slightly inflammable. I have discovered that resins thus characterized and distinguished make the best mixture to combine with phosphorus for match purposes, and I would distinctly mention this point as a portion of my discovery.

For the purpose of reference in the annexed claim to the above-mentioned substances and explanations I would designate resin in general by the letter A, sandarac by the letter B, shellac by the letter C, highly-inflammable resins by the letter D, and slightly-inflammable resins by the letter E.

I do not claim the use of the general substance marked as A in the foregoing specification as a coating for the tips of matches, nor the combination of phosphorus with earthy substances to render it less inflammable, nor its combination with glutinous substances to cause it to adhere; but What I do claim is—

1. The combination of phosphorus with the substances marked B and C, in the proportions and manner substantially and for the purpose set forth in the foregoing specification.

2. The combination of phosphorus with the substances marked D and E, in the said proportions and manner, and for said purpose.

3. The combination of phosphorus with the substance marked A, in said proportion and manner, and for said purpose.

WILLIAM PAGGETT ALLEN.

Witnesses:
 E. D. TURNER,
 ELIAS F. HONEY.